United States Patent
Bhushan et al.

(10) Patent No.: US 11,228,441 B2
(45) Date of Patent: Jan. 18, 2022

(54) SYSTEM FOR AUTOMATED DATA VERIFICATION

(71) Applicant: Accenture Global Solutions Limited, Dublin (IE)

(72) Inventors: Atmaj Bhushan, Pune (IN); Nitin Porwal, Pune (IN); Aniruddha Vijayprakash Sarag, Pune (IN); Rajesh Kumar Soni, Pune (IN)

(73) Assignee: Accenture Global Solutions Limited, Dublin (IE)

( * ) Notice: Subject to any disclaimer, the term of this patent is extended or adjusted under 35 U.S.C. 154(b) by 245 days.

(21) Appl. No.: 16/543,136

(22) Filed: Aug. 16, 2019

(65) Prior Publication Data

US 2021/0051021 A1    Feb. 18, 2021

(51) Int. Cl.

| G06F 17/00 | (2019.01) |
|---|---|
| H04L 9/32 | (2006.01) |
| G06K 9/00 | (2006.01) |
| G06F 16/35 | (2019.01) |
| G06F 40/18 | (2020.01) |

(52) U.S. Cl.
CPC ............ H04L 9/3242 (2013.01); G06F 16/35 (2019.01); G06F 40/18 (2020.01); G06K 9/00463 (2013.01)

(58) Field of Classification Search
CPC ....... H04L 9/3242; G06F 40/18; G06F 16/35; G06K 9/00463; Y02D 10/00
See application file for complete search history.

(56) References Cited

U.S. PATENT DOCUMENTS

| 2005/0223043 | A1* | 10/2005 | Randal ................. G06F 16/221 |
| 2009/0327343 | A1* | 12/2009 | McCormack ......... G06F 16/258 |
| 2016/0063050 | A1* | 3/2016 | Schoen ................ G06F 16/214 |
| | | | 707/690 |
| 2017/0103078 | A1* | 4/2017 | Greenblatt ............ G06F 40/154 |
| 2017/0220628 | A1* | 8/2017 | Bourbonnais ........... G06F 16/23 |

OTHER PUBLICATIONS

Chughtai, "How Do Credit Card Companies Assure the Integrity of Their Transactions?," 2011, p. 1-35 (Year: 2011).*
Wilbert et al., "Comparison of File Integrity Monitoring (FIM) Techniques for Small Business Networks," 2014, IEEE, p. 1-7 (Year: 2014).*

* cited by examiner

Primary Examiner — Andrew T McIntosh
(74) Attorney, Agent, or Firm — Plumsea Law Group, LLC

(57) ABSTRACT

The disclosure relates to a system, computer readable medium, and method for automated data verification. The disclosure provides highly automated, customizable ways of verifying the integrity of large sets of data to ensure that data migration has occurred correctly. Namely, source data is converted into spreadsheet files using a customizable set of field definitions and then filtered to identify corresponding sets of data to be verified. Once filtered, the data in the spreadsheets are converted in hashmaps, which can easily and efficiently be compared to each other to find any inconsistencies in the data. Accordingly, as a result of this process, large sets of source data can be error checked in an efficient manner that saves computing processing power and time. This disclosure therefore addresses the problem of how to perform comparisons of various data across multiple source systems in large volumes.

20 Claims, 5 Drawing Sheets

SYSTEM FOR AUTOMATED DATA VERIFICATION

TECHNICAL FIELD

The disclosure relates to a system, computer readable medium, and method for automated data verification and validation. More specifically, the present disclosure generally relates to software that automatically performs verification of multiple sets of data against each other to check for mismatches and inconsistences across a series of data migrations.

BACKGROUND

Generally, data verification is any computer related process that checks for accuracy in a set of data after a data migration has occurred. Data verification ensures that the data migration process did not introduce any new errors into the data. In the absence of data verification processes, data migration from one system to another may might introduce errors such as transpositions, loss of data structures, duplication, and others.

A wide range of programming techniques and tools are known to be used for data verification. Commonly, proprietary scripts are programmed for a particular type of data in a particular environment. Often, this approach successfully performs automated data verification for a particular type of data source—but may require reprogramming for each different type of data and for each different type of environment. Reprogramming efforts can introduce errors, require testing before reprogrammed code is used, and can delay subsequent data verification activities. Such scripts are also often computationally slow, requiring intensive computing power. These approaches may therefore not be suitable for large data sets that must be verified quickly and inexpensively.

Therefore, there is a need in the art for systems and methods that addresses the shortcomings discussed above.

SUMMARY

This disclosure provides solutions to the technical problem of performing data verification across large and diverse sets of data with minimal computing power, by: selectively converting the data into spreadsheet format using field definitions inputted by a user or otherwise received, then using the spreadsheet's filter function to convert each corresponding set of data into hashtables, and then comparing the hashtables. The data verification process is therefore done with vastly reduced computational resources and at a vastly increased speed.

In particular, in one aspect, the disclosure provides a system for automated data verification across multiple sets of source data, the system comprising one or more computers and one or more storage devices storing instructions that are operable, when executed by the one or more computers, to cause the one or more computers to: (1) receive at least a first set of source data and a second set of source data; (2) convert the first set of source data into a first spreadsheet including a first column name row and one or more rows of first data, using a first input positioning reference spreadsheet; (3) convert the second set of source data into a second spreadsheet including a second column name row and one or more rows of second data, using a second input positioning reference spreadsheet; (4) filter the first spreadsheet using a filter function to identify a first single row of data in the first spreadsheet and filter the second spreadsheet using the filter function to identify a second single row of data in the second spreadsheet, wherein the first single row of data and the second single row of data are corresponding data to be verified against each other; (5) create a first hashmap containing one or more key and value pairs, wherein the first column name row is converted into the one or more keys and the first single row of data is converted into the one or more paired values; (6) create a second hashmap containing one or more key and value pairs, wherein the second column name row is converted into the one or more keys and the second single row of data is converted into the one or more paired values; (7) compare the first hashmap to the second hashmap, by matching one or more keys in the first hashmap to one or more identical keys in the second hashmap then determining if a value paired with a key in the first hashmap is identical to a value paired with said key in the second hashmap; and (8) generate an output report identifying whether the values for each said key match or do not match.

In yet another aspect, the disclosure provides a method of automated data verification across multiple sets of data, the method comprising: (1) receiving a first spreadsheet including a first column name row and one or more first data rows; (2) receiving a second spreadsheet including a second column name row and one or more second data rows; (3) filtering the first spreadsheet using a filter function to identify a first single row of data in the first spreadsheet, and filtering the second spreadsheet using the filter function to identify a second single row of data in the second spreadsheet, wherein the first single row of data and the second single row of data are corresponding data to be verified against each other; (4) creating a first hashmap containing one or more key and value pairs, wherein the first column name row is converted into the one or more keys and the first single row of data is converted into the one or more paired values; (5) creating a second hashmap containing one or more key and value pairs, wherein the second column name row is converted into the one or more keys and the second single row of data is converted into the one or more paired values; (6) comparing the first hashmap to the second hashmap, by matching one or more keys in the first hashmap to one or more identical keys in the second hashmap then determining if a value paired with a key in the first hashmap is identical to a value paired with said key in the second hashmap; and (7) generating an output report identifying whether the values for each said key match or do not match; wherein the step of filtering the first spreadsheet and filtering the second spreadsheet includes: identifying a column that is present within both the first spreadsheet and the second spreadsheet, for which each row associated with the said column has a unique data value; and filtering each of the first spreadsheet and the second spreadsheet by the unique data value; and wherein the system repeats the steps of filtering the first spreadsheet and the second spreadsheet, creating the first hashmap and second hashmap, comparing the first hashmap to the second hashmap, and generating an output report for each row of data in the first spreadsheet, In yet another aspect, the disclosure provides one or more non-transitory computer readable storage media encoded with instructions that, when executed by a processor of a computing device, causes the processor to perform data verification across several credit card sets of source data by: (1) receiving first credit card source data set including data descriptive of at least one credit card transaction; (2) receiving second credit card source data set including data descriptive of the at least one credit card transaction; (3) converting the first credit card source data set into a first spreadsheet;

(4) converting second credit card source data set into a second spreadsheet; (5) using a filter function on the first spreadsheet to filter all but one row of credit card transaction data, and using a filter function on the second spreadsheet to filter all but one row of credit card transaction data, the one row in the first spreadsheet and the one row in the second spreadsheet being descriptive of the same credit card transaction; (6) creating a first hashmap from the one row in the first spreadsheet, and creating a hashmap from the one row in the second spreadsheet; (7) comparing the first hashmap to the second hashmap; and (8) generating an output report identifying when any value of data descriptive of the credit card transaction in the first spreadsheet does not match a value of corresponding data descriptive of the same credit card transaction in the second spreadsheet.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting, and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features, and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

Generally, this disclosure provides a system, computer readable medium, and method for automated data verification. Source data is collected, selectively converted into a spreadsheet, filtered, converted to hashmaps, and the compared. Various types and formats of source data can be verified using software in accordance with this disclosure, due to the open framework of an input positioning reference spreadsheet that is used to import the source data. Furthermore, the use of hashmaps allows sets of data to be compared easily and quickly. As a result, this disclosure provides a way to verify large sets of data in a scalable and efficient manner.

Figure 1:
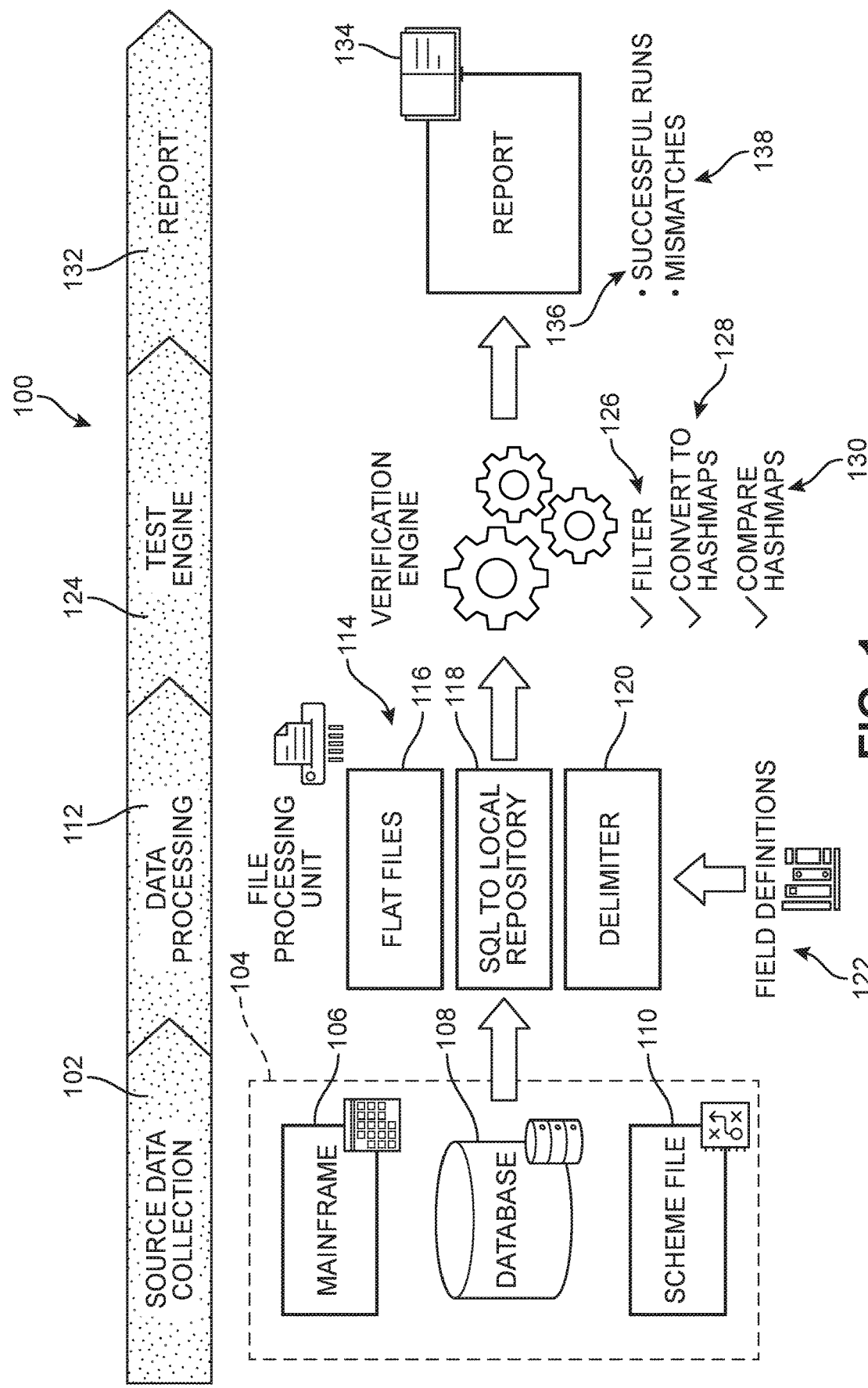
FIG. 1 is a diagram showing several generalized steps performed by a system in accordance with this disclosure.

FIG. 1 shows an overview diagram of a computing process 100 in accordance with this disclosure. In first step 102, the process 100 engages in source data collection. Generally, process 100 may receive at least a first set of source data and a second set of source data to be verified against each other. In a variety of embodiments, the number of sets of source data may vary—but, in an embodiment, in each case there are at least two sets of source data which are to be compared against each other for verification. In other embodiments, at least three sets of source data may be received, or at least four sets, or at least five sets, or many more. There is no inherent limit to the number of sets of source data, except to the extent that increasing computing power may be necessary to compare each of the sets with each other. In some embodiments, the process may receive at least 10 sets of source data, or at least 100 sets of source data, or at least 1,000 sets of source data.

Some types of exemplary sources of the source data 104 are shown in FIG. 1. Namely, source data 104 may originate from mainframe computers 106 that can be specialized computers commonly used for large data processing and transmission applications. Mainframe 106 may also refer to legacy systems that commonly run a variety of the many long-standing computing infrastructure across the globe. Source data 104 may also originate from a database 108. A wide range of databases 108 are commonly used across various industries, often using some version of SQL standards. Databases 108 can include standalone databases or distributed databases. Finally, source data 104 may originate from a card scheme file 110. Card schemes are payment networks that link payment cards, financial institutions, and merchants. Embodiments where source data 104 includes card scheme files 110 are discussed in greater below, especially with respect to FIG. 5.

Next, in step 112 process 100 engages in data processing. Generally, data processing step 112 includes converting source data files into spreadsheet files. The source data files 114 may generally be any of several formats. For example, source data file 114 may be a flat file 116. Flat file 116, as is generally known in the art, may be a plain text file that contains data arranged in a uniform format such as one record per line. In particular embodiments, flat files 116 may refer to fixed length (aka fixed width) plain text files that have a fixed length per field—using ordinal positions with offsets to identify where within the file each field is located.

Other types of source data files may also include a local repository file 118 created by querying database 108.

Finally, source data may be a delimiter file 120, such as a plain text file containing records separated by a delimiter character such as a comma or tab.

Step 112 of data processing may also include receiving field definitions 122 to convert the source data described above into spreadsheet files. In particular, field definitions 122 may be included in an input positioning reference spreadsheet. In some embodiments, input positioning reference spreadsheet may be generated by a user, or in other embodiment may be automatically generated by one or more algorithms. In particular, field definitions 122 in an input positioning reference spreadsheet may include a field names column, a start position column, and an end position column. The field names column may include one or more rows of data descriptive of one or more types of data contained in a source data file that are to be converted into a spreadsheet file during step 112. The start position column may include, for each type of data named in the field names column, a row of data descriptive of where within a source data file 114 each type of data to be converted into a spreadsheet begins. Similarly, the end position column may include, for each type of data named in the field names column, a row of data descriptive of where within the source data file 114 each type of data to be converted into the spreadsheet ends. In this way, the field definitions 122 are imputed into process 100 to map start and end positions in a source data file 114 (for example, in a fixed length flat file).

Table 1 shows an example embodiment of field definitions 122 that may be contained within an input positioning reference spreadsheet:

TABLE 1 field definitions

| Field Names | StartPostion | EndPosition |
|---|---|---|
| MID | 25 | 32 |
| Transaction Amount | 36 | 47 |
| DP Ref Number | 533 | 545 |
| ANBR | 61 | 67 |
| Card Number | 0 | 19 |
| Ref Journey | 67 | 79 |
| Date of Authorization | 258 | 262 |

The field definitions 122 shown in TABLE 1 include only seven fields. In other embodiments, field definitions 122 may include far more fields—such as at least 50 fields, or at least 100 fields, or at least 1,000 fields.

Notably, field definitions 122 in input positioning reference spreadsheet are customizable based on the source data file 114 and the data validation needs. Specifically, the field definitions 122 may only be descriptive of data in the source data file 114 that are to be validated by being importing into process 100. Field definitions 122 may therefore not necessarily be descriptive of all data fields in source data file 114. As a result, a field may be added or removed from the field definitions 122 (as contained in an input positioning spreadsheet) to include or exclude that field from validation—without changing any code in the process 100. This may allow greatly increased speed and efficiency of a validation process 100, by including only certain data fields from source data files 114 without the need to convert and process every data field in source data file 114. These data validation choices may be made by a user, in some embodiments. For example, a user may add or remove a field from the field definitions 122 as contained in an input positioning reference spreadsheet. In other embodiments, the data validation parameters of the field definitions 122 may be automatically chosen.

The open architecture of the field definitions 122 may also allow process 100 to be used on any of a variety of source files 114 that have differently formatted data. Source data files 114 may have any of a very wide range of data arrangements, according to a huge variety of standards and customs among various data environments. For example, fixed length flat files with any of a variety data positions may be imported. In this way, many thousands or tens of thousands of differently formatted data sources may be used and subject to data verification in accordance with this disclosure. Process 100 merely requires one set of accurate field definitions 122 contained within an input positioning reference spreadsheet in order to perform data validation on any arrangement of source data files 114, by converting the source data files 114 into respective spreadsheet files and then performing the subsequent steps in process 100. In this way, process 100 may be used to perform data validation on any of a wide range of data—including e.g. financial data, medical data, industrial data, or government data.

As a result, data processing step 112 converts source data files 114 into respective spreadsheet files. Each spreadsheet file may include a column name row and one or more rows of data. The column name row in the spreadsheet may correspond to the field names column in the field definitions 122 in an input positioning reference spreadsheet. The one or more rows of data may correspond to each associated set of data, with each field in each of the one or more columns.

As is generally known, a spreadsheet file generally includes data in a tabular format. Namely, data and equations may be stored in cells, which are each organized into rows and columns. In various embodiments, a spreadsheet file may include only data, or mixtures of data and equations. Arranged in a grid, each cell in a spreadsheet may be located by its column name and row name. Spreadsheets generally offer more data structure than, e.g., flat files, and allow the converted spreadsheets to be subject to additional steps (step 124) that would not otherwise be possible in certain native data formats. Examples of computing applications/programs for using spreadsheet files include, but are not limited to, Microsoft Excel, Lotus 1-2-3, OpenOffice Calc, VisiCalc, and Google Sheets. In a particular embodiment, the present method may operate using Java in conjunction with Microsoft Excel.

An example of data in a spreadsheet file created in step 112 is shown in TABLE 2:

TABLE 2 spreadsheet data file

| MID | Transaction Amount | DP Ref Number | ANBR | Card Number | Ref Journey | Date of Authorization |
|---|---|---|---|---|---|---|
| 1111111 | 9.65 | NA | 3252 | 1234567891234567 | J1AUATR2_1 | NA |
| 1111111 | 9.55 | NA | 3252 | 1234567891234567 | J1AUATR2_2 | NA |
| 1111111 | 8.89 | NA | 3252 | 1234567891234567 | J1AUATR2_6 | NA |
| 1111112 | 8.88 | NA | 3252 | 1234567891234567 | J1ACurr_CAD | NA |
| 1111111 | 7.46 | NA | 3252 | 1234567891234567 | J1AUATR2_7 | NA |
| 1111111 | 7.47 | NA | 3252 | 1234567891234567 | J1AUATR2_8 | NA |

TABLE 2-continued spreadsheet data file

| MID | Transaction Amount | DP Ref Number | ANBR | Card Number | Ref Journey | Date of Authorization |
|---|---|---|---|---|---|---|
| 1111111 | 7.48 | NA | 3252 | 1234567891234567 | J1AUATR2_9 | NA |
| 1111111 | 5.65 | NA | 3252 | 1234567891234567 | J1AUATR2_10 | NA |
| 1111111 | 7.5 | NA | 3252 | 1234567891234567 | J1AUATR2_11 | NA |
| 1111111 | 7.51 | NA | 3252 | 1234567891234567 | J1AUATR2_12 | NA |

As can be seen by comparing TABLE 2 with TABLE 1 above, the column name row in TABLE 2 corresponds to the field names column in TABLE 1, Specifically, the top row in TABLE 2 ("MID", "Transaction Amount", etc.) corresponds to these same field names in TABLE 1.

The data in TABLE 2 is converted from a source data file 114 according to the start positions and end positions shown in TABLE 1.

Process 100 next includes step 124 that is the test engine, also referred to as verification engine. In step 124, process 100 filters the two or more spreadsheets to identify one corresponding row in each (126), converts the filtered rows into hashmaps (128), then compares the hashmaps to identify data mismatches (130).

Specifically, step 124 receives the two or more spreadsheets generated in data processing step 112. Step 124 next includes using a filter function within each spreadsheet to isolate a single row of data within each spreadsheet. The filter function is a built-in function of many spreadsheet programs, such as Microsoft Excel, that filters a range of data based on supplied criteria, and extracts matching records. To filter each spreadsheet, the process 100 may identify a column that is present within each of the two or more spreadsheets for which each row associated with that column has a unique data value. For example, looking at TABLE 2, both "Transaction Amount" and "Ref Journey" each have unique values. Assuming that either of these columns is present in a second spreadsheet to which the data in TABLE 2 is being verified, either of these columns may be the unique value column on which each of the two spreadsheets may filtered to isolate one row at a time.

The filter function within many spreadsheet programs is a computationally efficient way to sort through large sets of data and is much more efficient than, e.g., scripting with a conventional loop method. The filter function can be automated using an interface such as Apache Poor Obfuscation Implementation (POI) that allows java programming to automatically manipulate spreadsheet files with Microsoft Excel.

Figure 4:
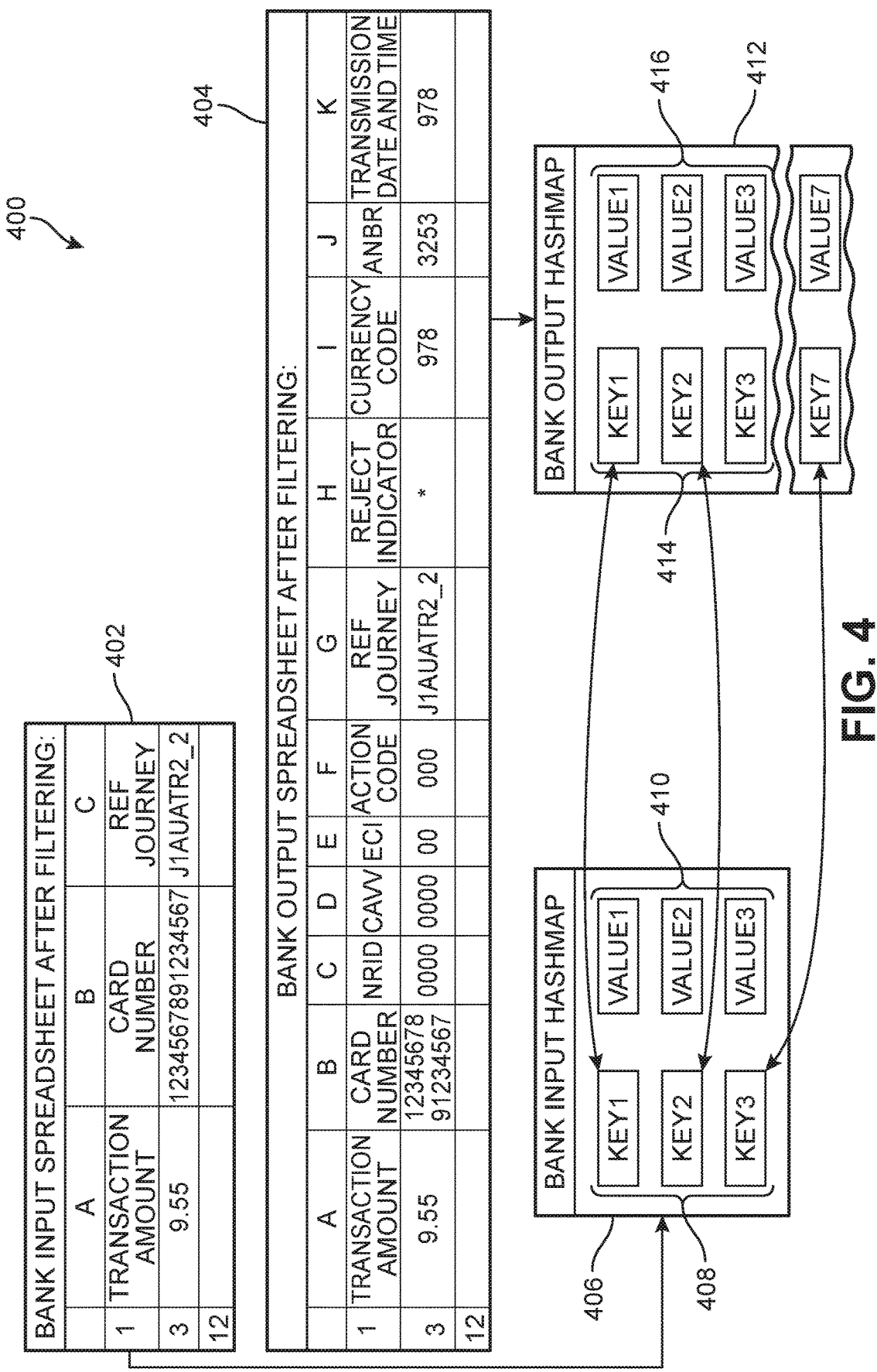
FIG. 4 is a diagram of how certain data fields are mapped from each of two spreadsheets into each respective hashmap.

Skipping ahead, FIG. 4 shows the filtering step in greater detail. Specifically, first spreadsheet 402 is a subset of a filtered version of the data in TABLE 2. Specifically, first spreadsheet 402 as shown in FIG. 4 results from filtering a spreadsheet containing the data shown in TABLE 2 by the unique value "9.55" for the Transaction Amount. Second spreadsheet 404 is then also filtered by the same unique value 9.55, which isolates row 3 and its associated data. FIG. 4 shows how row 3 in first spreadsheet 402 corresponds to row 3 in second spreadsheet 404, as they both have identical "Transaction Amount" and "Ref Journey" values. Filtering the first spreadsheet 402 and the second spreadsheet 404 to identify one corresponding row in each spreadsheet allows a variety of the data in second spreadsheet 404 to subsequently be verified against the data in first spreadsheet 402.

Namely, also in step 124, process 100 converts the one filtered row into a Java hashmap, which is a map that stores data in key I value pairs. A hashmap also includes hashing each of the key and the value, which converts each of the actual data value for the key and value into a smaller string that represents the original values. The smaller string helps increase computational efficiency of indexing and searching within the map. As with all maps, duplicate values are allowed but duplicate keys are not.

Specifically, in step 124 process 100 converts the one filtered row into a hashmap by converting the column name row into one or more keys and converting the one or more rows of data into the corresponding values. That is, each key I value pair is made up of the column name and the data value within that column for the filtered row. In this way, the column names (as originally defined by the field definitions 122 in an input positioning reference spreadsheet) should be unique to avoid duplicate keys.

FIG. 4 also shows how first spreadsheet 402 may be converted to first hashmap 406. Namely, row 1 in first spreadsheet 402 is the column name row, and row 3 is the filtered data row. Cell A1 in column name row 1 "TRANSACTION AMOUNT" therefore becomes "KEY1" and the data field in column A in filtered row 3 "9.55" becomes "VALUE1"—after being hashed. Similarly, cell B1 in column name row 1 "CARD NUMBER" becomes "KEY2" and data value in filtered row 3 "1234567891234567" is converted into "VALUE2", and so on. Accordingly, first hashmap 406 includes three keys 408 and three paired values 410.

Similarly, FIG. 4 also shows how second spreadsheet 404 may be converted into second hashmap 412. Column name row 1 in second spreadsheet 404 is converted into each of several keys 414, and the data in the one filtered row 3 then is converted to each paired value 416. Second spreadsheet 404 includes additional columns with additional data as compared to first spreadsheet 402. Nonetheless, similar data fields will have the same column name—such as "TRANSACTION AMOUNT", "CARD NUMBER", and "REF JOURNEY". Some of these columns may also be in different orders in second spreadsheet 404, for example "REF JOURNEY" is the seventh column in second spreadsheet 404 while it is the third column in first spreadsheet 402. Nonetheless, the column names will be converted into identical keys albeit having different key positions.

In a final step within the verification engine of step 124 of process 100, the method may compare the two hashmaps created from the filtered rows. The comparison may occur by matching one or more keys in the first hashmap to one or more identical keys in the second hashmap, and then determining if a value paired with a key in the first hashmap is identical to a value paired with said key in the second hashmap.

FIG. 4 also shows the comparison between the two hashmaps. Specifically, first hashmap 406 includes KEY1 with paired VALUE1 and second hashmap 412 includes it's KEY1 with paired VALUE1. Because KEY1 in first hashmap 406 will be identical to KEY1 in second hashmap 412 (because both are hashes of "TRANSACTION AMOUNT"), the program in accordance with this disclosure will check that VALUE1 in second hashmap 412 is identical to VALUE1 in first hashmap 406. If it is, this data is successfully verified. If it is not identical, then the method will generate an error message identifying the problem.

Similarly, KEY2 in first hashmap 406 is identical to KEY2 in second hashmap 412, and KEY5 in first hashmap 406 is identical to KEY7 in second hashmap 412. Therefore, each pair of VALUEs will be checked, This is done for the one filtered row, and then a new row is filtered based on a different unique value for the column identified as described above.

In this way, a process in accordance with this disclosure allows source data files 114 to be converted into a spreadsheet format that is easily filtered to identify each unique row of data at step 112, then each set of corresponding data is verified against each other by converting into easily compared hashmaps at step 124.

Finally, at step 132 process 100 generates a report 134 that records the results of each comparison. A "pass"/"fail" record can be generated for each pair of KEYs that are compared between any two hashmaps. Report 134 may be in the form of a spreadsheet, with each comparison result being in a column identifying the two sets of data being verified against each other—with each row being the result for a corresponding row of data. Report 143 may therefore identify both successful runs/verification 136 and any mismatches 138. TABLE 3 shows an embodiment of a report 134.

TABLE 3

Report

| DB to PaymentOut | Comments |
|---|---|
| Passed | Validation of all fields of DB and PaymentOut is true |
| Passed | Validation of all fields of DB and PaymentOut is true |
| Passed | Validation of all fields of DB and PaymentOut is true |
| Failed | Validation of all fields of DB and PaymentOut is false where Expected Value: '616' and Actual Value: '40' for Merchant Country Code |
| Passed | Validation of all fields of DB and PaymentOut is true |
| Passed | Validation of all fields of DB and PaymentOut is true |
| Passed | Validation of all fields of DB and PaymentOut is true |
| Passed | Validation of all fields of DB and PaymentOut is true |
| Passed | Validation of all fields of DB and PaymentOut is true |
| Passed | Validation of all fields of DB and PaymentOut is true |

In this embodiment, "DB" is the first set of data and "PaymentOut" is the second set of data. The report identified one mismatch, and reported the expected value based on an assumption that the first set of data is correct and the second set of data experienced an error during data migration.

Figure 2:
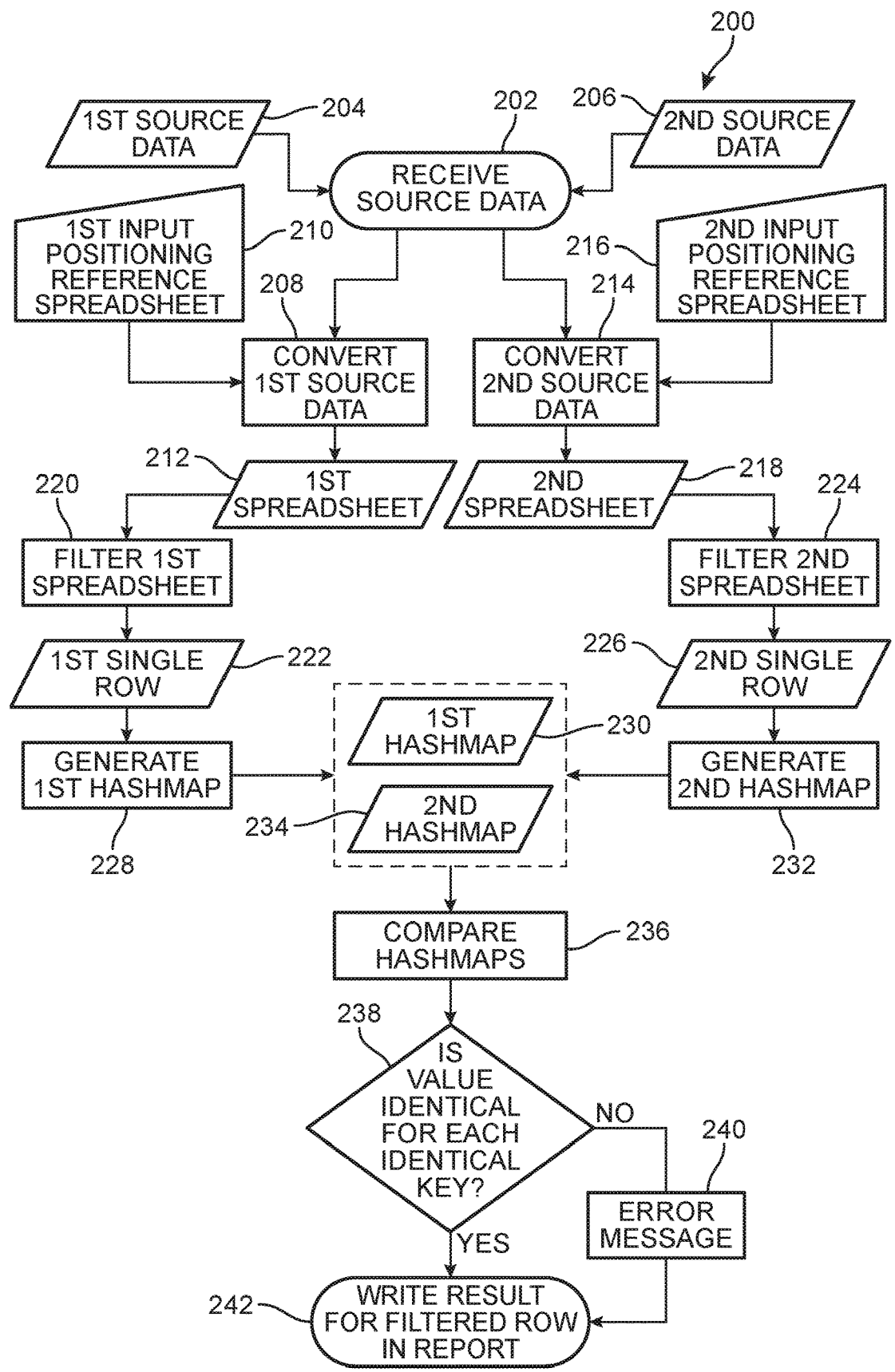
FIG. 2 is a flow chart of a method in accordance with this disclosure.

FIG. 2 shows a particular embodiment of a computing process in accordance with this disclosure. In the particular embodiment shown in FIG. 2, process 200 begins when the system performing process 200 receives 202 at least first set of source data 204 and second set of source data 206. First set of source data 202 and second set of source data 206 may be two sets of data that are to be verified against each other, such as a set of data before and after a data migration. In this embodiment in particular, second set of source data 206 will be verified against first set of source data 204.

Next, at step 208 process 200 converts first set of source data 204 into a first spreadsheet 212 by using a first input positioning spreadsheet 210. First input positioning spreadsheet contains the field definitions 122, an example of which is shown in TABLE 1 above. First input positioning spreadsheet 210 may be user generated, in order to define the data fields in need of verification according to the user's needs. However, in other embodiments, first input positioning spreadsheet 210 may be automatically generated according to one or more algorithms. Generation of the first input positioning spreadsheet 210 may be a one-time activity for each type of data to be verified by process 200. That is, for a given type of data, the user or automatic process need only map the field names, start positions, and end positions once and use the generated data in the first input positioning spreadsheet 122 for many runs on that same type of data. Alternatively, the user or automatic process may customize the first input positioning spreadsheet 210 at any time between runs to change how the data is verified by controlling which source data 204 is converted into the first spreadsheet 212.

First spreadsheet 212 may include a first column name row that labels one or more columns, and one or more rows of first data. First column name row may be converted from the input received in the first input positioning reference spreadsheet, and the one or more rows of first data may be the first source data 204 as formatted into the first spreadsheet 212.

Step 214 next may include converting second set of source data 206 into second spreadsheet 218, by using a second input positioning reference spreadsheet 216. Second input positioning reference spreadsheet 216 may include field name, start position, and end position data that is descriptive of which data fields in second set of source data 206 will be imported into second spreadsheet 218 and wherein within second set of source data 206 said data fields are located. Second input positioning reference spreadsheet 216, like first input positioning reference spreadsheet 210, may be user generated or may be automatically generated. In this way, by customizing first input positioning reference spreadsheet 210 and second input positioning reference spreadsheet 216, a user may define which data within the first set of source data 204 and the second set of source data 206 will be subject to data verification process 200.

Next, process 200 at step 220 filters first spreadsheet 212 based on a unique value to identify a first single row of data 222 in first spreadsheet 212. Step 220 may be done using a spreadsheet program's filter function, as discussed above. Also as discussed above, FIG. 4 shows examples of filtered spreadsheets 402 and 404. In step 224, process 200 next filters second spreadsheet 218 by the same unique value in order to identify a second single row of data 226, within the second spreadsheet 218. As a result of using the same unique value, first single row of data 222 and second single row of data 226 may be corresponding sets of data which will be verified against each other by process 200.

First single row of data 222 in first spreadsheet 212 is then converted into a first hashmap 230 at step 228. Step 228 of generating first hashmap 230 may include converting the first column name row in first spreadsheet 212 into one or more keys, and first single row of data 222 may be converted into one or more paired values. As discussed above, a hashmap includes one or more key/value pairs. First hashmap 230 therefore converts the column/row relationship in first spreadsheet 212 into the key/value pair relationships therein, and also hashes the data from the spreadsheet in order to create shorter strings that take less computational resources to index and search. A similar process is used to generated second hashmap 234 at step 232 from second single row of data 226 in second spreadsheet 218.

The two hashmaps 230, 234 may then be compared to each other at steps 236 and 238. Specifically, first hashmap 230 and second hashmap 234 may be compared by matching one or more identical keys in first hashmap 230 to one or more identical keys in second hashmap 234. Then, step 236 determines if a value paired with a key in first hashmap 230 is identical to a value paired with said key in second hashmap 234.

Step 238 then generates an error message 240 if the values for the same key are not identical.

Figure 3:
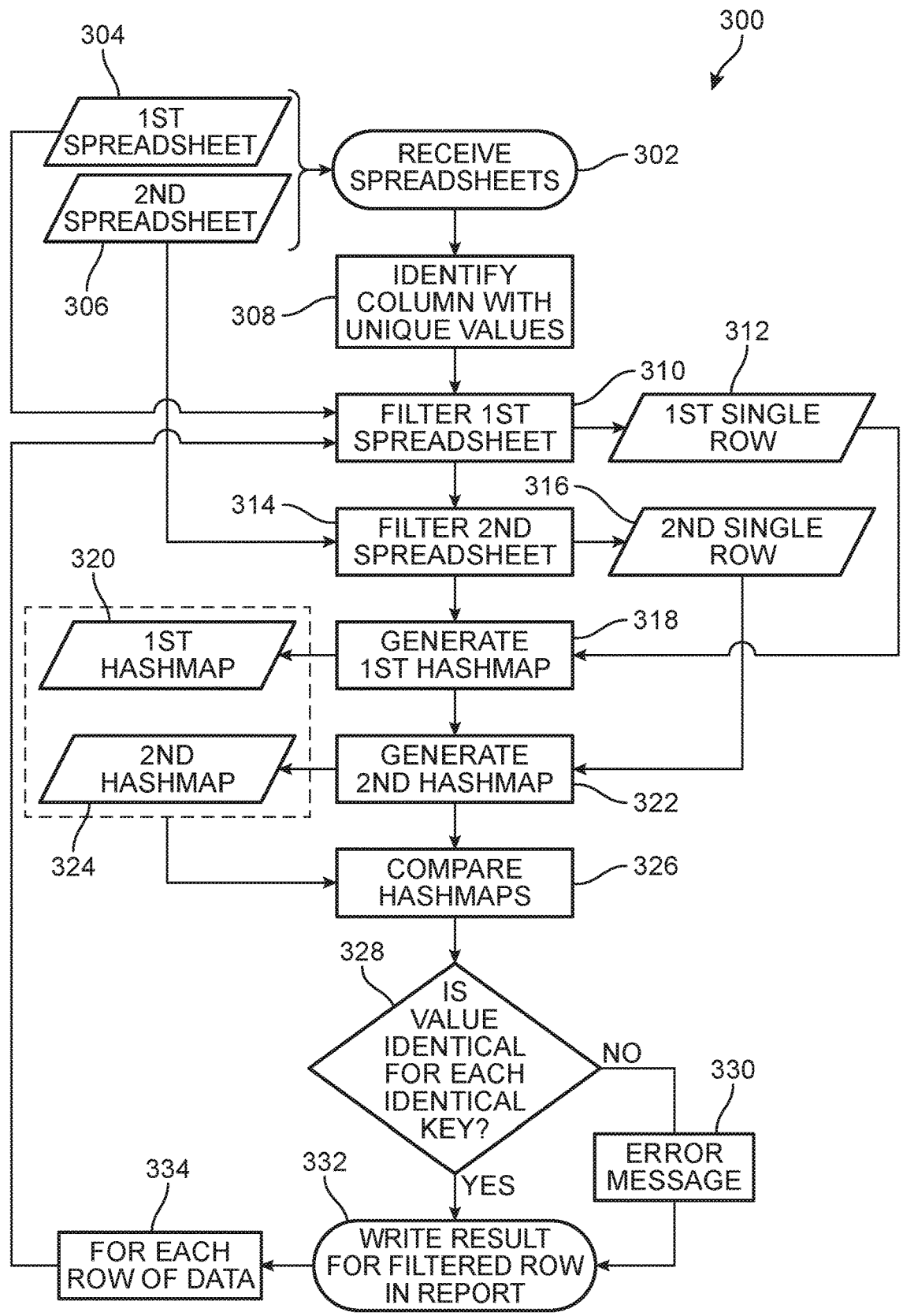
FIG. 3 is a flow chart of another embodiment of a method in accordance with this disclosure.

Finally, process 200 may terminate at step 242 when the process writes a result detailing the result of the comparison at steps 236, 238 into a report. An embodiment of a report is shown above at TABLE 3 and discussed above. However, step 242 in process 200 may merely write one output result that corresponds to the filtered rows which were identified at steps 220, 224. In other embodiments, a report may look more similar to TABLE 3 above by containing multiple output results when a data verification process is repeated several times to verify multiple rows of data in the spreadsheets, For example, FIG. 3 shows a different embodiment of a data verification process 300. First, process 300 may initiate with receiving a first spreadsheet 304 and a second spreadsheet 306 at step 302. In certain embodiments, source data to be verified may already be in the form of spreadsheet files and may thus not require conversion from a different file format. First spreadsheet 304 may include a first column name row and one or more first data rows, and second spreadsheet 306 may include a second column name row and one or more second data rows.

Process 300 next includes step 308 of identifying a column that is present in both the first spreadsheet 304 and the second spreadsheet 306 for which each row of data associated with that column has a unique value. This unique value column may then be used in step 310 to filter first spreadsheet 304 to identify first single row of data 312, and also used in step 314 to filter second spreadsheet 306 to identify corresponding second single row of data 316.

As in process 200 shown in FIG. 2, process 300 includes step 318 of generating a first hashmap 320 by converting first single row of data 312 and also generating a second hashmap 324 by converting second single row of data 316 at step 322. Step 326 next compares the first hashmap 320 and the second hashmap 324, and step 328 generates error message 330 if the two values for an identical key are not identical. Step 332 then writes the output results including any error message 330 to a report, such that a user may review any failed data verification.

Notably, FIG. 3 as shows how process 300 repeats itself to perform data verification across all data in the spreadsheets 304, 306. In embodiments where first spreadsheet 304 and second spreadsheet 306 include multiple rows of data, process 300 may perform data verification across all of the multiple rows of data. Namely, step 334 includes looping back to step 310 such that process 300 repeats the steps of filtering 310 the first spreadsheet 304 and filtering 314 the second spreadsheet 306. However, each time steps 310, 314 are repeated the process 300 filters to a different unique value within the identified column per step 308. By filtering to a different unique value, process 300 verified each set of corresponding rows of data—one set at a time. For example, FIG. 4 shows first filtered spreadsheet 402 and second spreadsheet 404 where the filtered row is row three in the spreadsheets—and the associated unique value may be the TRANSACTION AMOUNT value of 9.55. However, each loop 334 to 310 in process 300 would identify a different data row, such as row 2 or 4 or 5 etc., based on a different TRANSACTION AMOUNT unique value.

In this way, for each loop 334 process 300 generates a different first single row 312 and a different second single row 316. Once the different rows are identified, the steps 318, 322, 326, 328 are repeated in a substantially similar manner. As a result, each row of data in first spreadsheet 304 and second spreadsheet 306 undergoes data verification.

Figure 5:
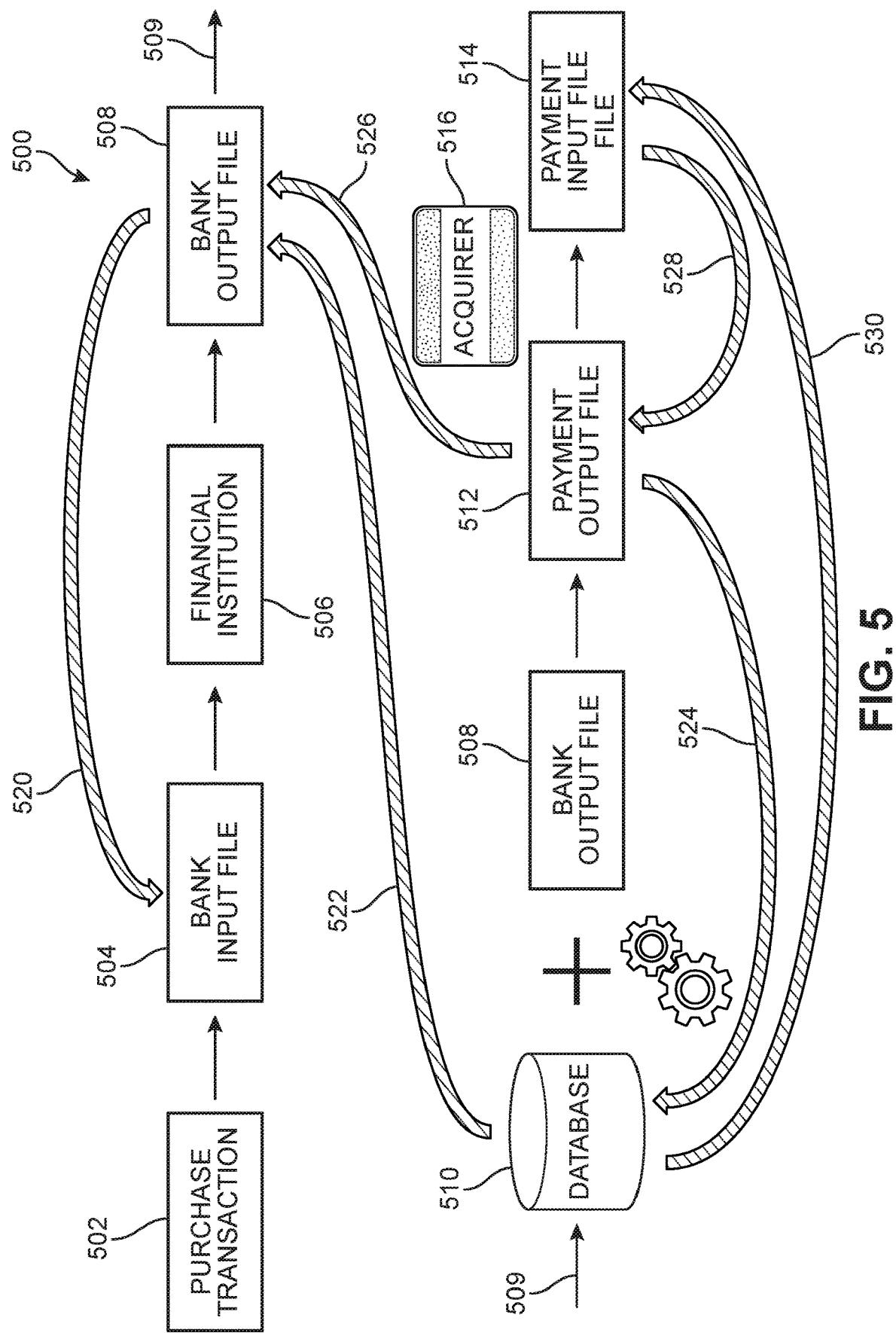
FIG. 5 is a diagram of how data migrates across a credit card payment network.

In some particular embodiments, the data being verified by a process in accordance with this disclosure maybe credit card data that is descriptive of transaction data passed between several parties in a credit card payment network. FIG. 5 shows source data that may be used in this type of embodiment in greater detail.

In particular, FIG. 5 shows a diagram of several processes and related data files used in a payment transaction across a credit card payment network. Such a credit card payment network 500 is one example of a complex system where repeated data migration occurs with extremely large sets of data, and therefore there is a need for data verification that can be performed in a highly efficient and accurate manner.

Credit card payment network 500 begins with a purchase transaction 502 being initiated at a terminal using a credit card. Step 502 may result in the network 500 generating a bank input file 504. Bank input file 504 may include transaction information like merchant number, transaction amount, card number, card type, and mode of the transaction and may be a fixed length flat format file. Bank input file 504 may then be sent to financial institution 506 (such as a bank or other credit card issuer). Financial institution 506 may then generate bank output file 508 at least partially based on bank input file 504. Bank output file 508 may be generated by the financial institution after receipt of the bank input file 504, and may also contain additional new data fields which will be used in later stages of payment network 500. Bank output file 508 may also be a fixed length flat format file.

FIG. 4 shows an abbreviated representative bank input file, as converted to first spreadsheet 402, that includes data such as TRANSACTION AMOUNT, CARD NUMBER, and REF JOURNEY. FIG. 4 also shows an abbreviated representative bank output file, as converted to second spreadsheet 404. Second spreadsheet, based on a bank output file 508, includes data multiple additional data fields as compared to first spreadsheet 402.

As diagramed in FIG. 5, bank output file 508 is "downstream" of bank input file 504 in the order of card payment network 500. As a result, bank output file 508 includes data that should be verified against bank input file as shown by 520. A process for data verification in accordance with this disclosure, such as process 200 shown in FIG. 2, may therefore perform data verification of these two files 504, 508. Namely, first set of source data 204 may be bank input file 504, and second set of source data 206 may be bank output file 508. In this way, data in bank output file 508 may be verified against data in bank input file 504.

Further, card payment network 500 next includes a database 510. Database 510 may contain merchant billing information and settlement information, apart from the regular transaction information specific to one credit card transaction as previous generated by the card payment network 500. Data from database 510 may be extracted by querying database 510, then converting SQL results to a local repository per 118 in FIG. 1. Data from database 510 may be verified against bank output file 508 as noted by 522 in FIG. 5, by having bank output file 508 be first set of source data 204 in process 200 and data from database 510 be the second set of source data 206.

Next, card payment network 510 may generate payment output file 512 based on bank output file 508 and database 510. Payment output file 512 may be a fixed length flat format file. In various processes, payment output file 512 may be verified against bank output file 508 as shown by 526 in FIG. 5 and verified against database 510 as shown by 524. That is, in various embodiments, bank output file 508 may act as first set of source data 204 in process 200 and payment output file may act as second set of source data 206—and database data 510 may act as first set of source data 204, and payment output file may act as second set of source data 206. In this way, payment output file is verified against multiple downstream sources of data.

Finally, card payment network 500 may generate payment input file 514 based on payment output file 512. Payment input file 514 may also be a fixed length flat format file. Broadly, payment input file 514 may provide a payment response, whether the transaction is cleared or rejected. Payment input file 514 and payment output file 512 may generated by a card acquirer 516. Payment input file 514 may be verified against payment output file 512 as noted by 528 in FIG. 5. Namely, payment output file 512 may act as first set of source data 204 in process 200, and payment input file 514 may act as second set of source data 206. Additionally, database data 510 may also be verified against payment input file 512 as noted by 530 in FIG. 5.

FIG. 5 shows data verification relationships 520, 522, 524, 526, 528, 530 in particular pairs. Namely, arrow 520 shows how bank output file 508 and bank input file 504 are verified against each other in a pair; arrow 522 shows how database 510 and bank output file 508 are verified against each other in a pair; arrow 524 shows how payment output file 512 and database 510 are verified against each other in a pair; arrow 526 shows how payment output file 512 and bank input file 508 are verified against each other in a pair; arrow 528 shows how payment input file 514 and payment output file 512 are verified against each other in a pair: and finally arrow 530 shows how database 510 and payment input file 514 are verified against each other in a pair.

However, in other embodiments, a data verification process like process 200 or process 300 may include receiving each of the source data files 504, 508, 510, 512 and 514. For example, process 300 may include performing data verification across several credit card sets of source data, by receiving each of: the bank input file 504, the bank output file 508, the database data 510, the payment output file 512, and the payment input file 514.

In the embodiment of FIG. 5, process 300 may then convert each of the sets of source data into respective spreadsheets, by: converting the bank input file 504 into a bank input spreadsheet, converting the bank output file 508 into a bank output spreadsheet, converting the database data file 510 into a database spreadsheet, converting the payment output file 512 into a payment output spreadsheet, and converting the payment input file 514 into a payment input spreadsheet.

The embodiment of FIG. 5 may then perform data validation across the several credit card sets of source data by repeating the method of auto data verification for multiple pairs of the several spreadsheets. With reference to FIG. 3, this may be done by: having the bank input spreadsheet be the first spreadsheet 304 and the bank output spreadsheet be the second spreadsheet 306, having the bank output spreadsheet be the first spreadsheet 304 and the database spreadsheet be the second spreadsheet 306, having the bank output spreadsheet be the first spreadsheet 304 and the payment output spreadsheet be the second spreadsheet 306, having the database spreadsheet be the first spreadsheet 304 and the payment output spreadsheet as the second spreadsheet 306, having the payment output spreadsheet be the first spreadsheet 304 and the payment input spreadsheet be the second spreadsheet 306, and finally having the payment input spreadsheet as the first spreadsheet 304 and the database spreadsheet as the second spreadsheet 306. These features allow a process 300 to be repeated until each set of data is verified against its downstream counterparts.

Additionally, card payment network files may also have other features that affect how the data therein is handled and would be verified by a process in accordance with this disclosure. Specifically, there may be data fields that are not one-to-one mapped. In these cases, a process may draw from a user generated set of mapping correlations. TABLE 4 shows an example of such correlations:

TABLE 4

| | mapping correlations | |
|---|---|---|
| Fields | Bank in put file/bank output file | Payment output file/ payment input file |
| Transaction Code | 6 | 101 |
| Transaction Code | 7 | 102 |
| Transaction Code | 5 | 100 |
| Identifier of Transaction Features | 5 | F |
| Identifier of Transaction Features | 6 | R |
| Identifier of Transaction Features | 0 | 0 |
| Identifier of Transaction Features | Any | 1 |
| Identifier of Transaction Features | NA | 0 |
| Card Level (IN) | 59 | 0 |
| Card Level (IN) | 53 | 1 |
| Card Level (IN) | 54 | 2 |
| Card Level (IN) | 55 | 3 |
| Card Level (IN) | 56 | 4 |
| Card Level (IN) | 57 | 5 |
| Card Level (IN) | 58 | 6 |

In such non one-to-one mapping scenarios, the differently mapped value (such as in the third, most right hand column of Table 4) would deliberately not be identical to the original value (such as in the second, middle column of Table 4). Therefore, a data verification process would need to take this into account. Namely, a data verification process in accordance with this disclosure may be programmed to receive a set of mapping correlations. Then the data verification process may report a comparison as successfully "passed" when the second set of data matches the data correlation value—instead of flagging the comparison as failed because the data is not identical.

Therefore, card payment network 500 involves data generation and data migration at each of several steps along the course of processing a payment transaction. Various formats are used in the different steps in this process, with data in various file types and also in various formatting within a given file type. Furthermore, very large numbers of credit card purchase transactions are generated every day. Therefore, card payment networks present a challenging environment for conducting data verification in an efficient and accurate manner. This disclosure addresses this technical problem, as various discussed herein.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A system for automated data verification across multiple sets of source data, the system comprising one or more computers and one or more storage devices storing instructions that are operable, when executed by the one or more computers, to cause the one or more computers to:
receive a first set of source data and a second set of source data;
convert the first set of source data into a first spreadsheet,
the first spreadsheet including a first column name row and one or more rows of first data, and
the converting the first spreadsheet performed using a first input positioning reference spreadsheet;
convert the second set of source data into a second spreadsheet,
the second spreadsheet including a second column name row and one or more rows of second data, and
the converting the second spreadsheet performed using a second input positioning reference spreadsheet;
filter the first spreadsheet using a filter function to identify a first single row of data in the first spreadsheet and filter the second spreadsheet using the filter function to identify a second single row of data in the second spreadsheet, wherein the first single row of data and the second single row of data are corresponding data to be verified against each other;
create a first hashmap containing one or more key and value pairs, wherein:
the first column name row is converted into the one or more keys, and
the first single row of data is converted into the one or more paired values;
create a second hashmap containing one or more key and value pairs, wherein:
the second column name row is converted into the one or more keys, and
the second single row of data is converted into the one or more paired values;
compare the first hashmap to the second hashmap, the comparing comprising:
matching one or more keys in the first hashmap to one or more identical keys in the second hashmap, and
determining if a value paired with a key in the first hashmap is identical to a value paired with the key in the second hashmap; and
generate an output report,
the output report identifying whether the determining indicates that the value paired with the key in the first hashmap is identical to the value paired with the key in the second hashmap; and
wherein the method includes performing data verification across several sets of source data by:
receiving several sets of source data, the several sets of source data including:
a bank input fixed length flat format file including data descriptive of at least one transaction,
a bank output fixed length flat format file that is generated based on the bank input file and includes data descriptive of the at least one transaction,
a database file generated by querying a database and exporting the query results and includes data descriptive of the at least one transaction,
a payment output file fixed length flat format file that is generated based on the bank output file and information from the database, and includes data descriptive of the at least one transaction, and
a payment input fixed length flat format file that is generated based on the payment output file and includes data descriptive of the at least one transaction;
converting the several sets of source data into respective spreadsheets by converting the bank input file into a bank input spreadsheet, converting the bank output file into a bank output spreadsheet, converting the database file into a database spreadsheet, converting the payment output file into a payment output spreadsheet, and converting the payment input file into a payment input spreadsheet; and
performing data validation across the several sets of source data by repeating the method of automated data verification for multiple pairs of the spreadsheets with:
the bank input spreadsheet as the first spreadsheet and the bank output spreadsheet as the second spreadsheet,
the bank output spreadsheet as the first spreadsheet and the database spreadsheet as the second spreadsheet,
the bank output spreadsheet as the first spreadsheet and the payment output spreadsheet as the second spreadsheet,
the database spreadsheet as the first spreadsheet and the payment output spreadsheet as the second spreadsheet,
the payment output spreadsheet as the first spreadsheet and the payment input spreadsheet as the second spreadsheet, and
the payment input spreadsheet as the first spreadsheet and the database spreadsheet as the second spreadsheet.

2. The system of claim 1, wherein the step of filtering the first spreadsheet and filtering the second spreadsheet includes:
identifying a column that is present within both the first spreadsheet and the second spreadsheet, for which each row associated with the said column has a unique data value; and
filtering each of the first spreadsheet and the second spreadsheet by the unique data value.

3. The system of claim 1, wherein the system receives the first input positioning reference spreadsheet and the second input positioning reference spreadsheet from a user.

4. The system of claim 1, wherein
the first input positioning reference spreadsheet includes:
a field names column including one or more rows of data descriptive of one or more names of types of data contained in the first set of source data that are to be imported into the first spreadsheet;
a start position column including, for each type of data named in the field names column, a row of data descriptive of where within the first set of source data the type of data to be imported into the first spreadsheet begins; and
an end position column including, for each type of data named in the field names column, a row of data descriptive of where within the first set of source data the type of data to be imported into the first spreadsheet ends;
and wherein:
the field names column in the first input positioning reference spreadsheet is converted into the first column name row in the first spreadsheet; and the start position column and the end position column define which data in the first set of source data becomes associated with which column in the first spreadsheet.

5. The system of claim 1, wherein a user defines which data within the first set of source data and the second set of source data will be verified by:
   entering field name, start position, and end position data into the first input positioning reference spreadsheet that is descriptive of which data fields in the first set of source data will be imported into the first spreadsheet and where within the first set of source data said data fields are located; and
   entering field name, start position, and end position data into the second input positioning reference spreadsheet that is descriptive of which data fields in the second set of source data will be imported into the second spreadsheet and where within the second set of source data said data fields are located.

6. The system of claim 1, wherein the system:
   repeats the steps of filtering the first spreadsheet and the second spreadsheet, creating the first hashmap and second hashmap, and comparing the first hashmap to the second hashmap, for each row of data in the first spreadsheet.

7. A method of automated data verification across multiple sets of data, the method comprising:
   receiving a first spreadsheet including a first column name row and one or more first data rows;
   receiving a second spreadsheet including a second column name row and one or more second data rows;
   filtering the first spreadsheet using a filter function to identify a first single row of data in the first spreadsheet, and filtering the second spreadsheet using the filter function to identify a second single row of data in the second spreadsheet, wherein the first single row of data and the second single row of data are corresponding data to be verified against each other;
   creating a first hashmap containing one or more key and value pairs, wherein the first column name row is converted into the one or more keys and the first single row of data is converted into the one or more paired values;
   creating a second hashmap containing one or more key and value pairs, wherein the second column name row is converted into the one or more keys and the second single row of data is converted into the one or more paired values;
   comparing the first hashmap to the second hashmap, by matching one or more keys in the first hashmap to one or more identical keys in the second hashmap then determining if a value paired with a key in the first hashmap is identical to a value paired with said key in the second hashmap; and
   generating an output report identifying whether the values for each said key match or do not match;
   wherein:
      the step of filtering the first spreadsheet and filtering the second spreadsheet includes: identifying a column that is present within both the first spreadsheet and the second spreadsheet, for which each row associated with the said column has a unique data value; and filtering each of the first spreadsheet and the second spreadsheet by the unique data value;
   wherein:
      the system repeats the steps of filtering the first spreadsheet and the second spreadsheet, creating the first hashmap and second hashmap, comparing the first hashmap to the second hashmap, and generating an output report for each row of data in the first spreadsheet; and
   wherein the method includes performing data verification across several sets of source data by:
   receiving several sets of source data, the several sets of source data including:
      a bank input fixed length flat format file including data descriptive of at least one transaction,
      a bank output fixed length flat format file that is generated based on the bank input file and includes data descriptive of the at least one transaction,
      a database file generated by querying a database and exporting the query results and includes data descriptive of the at least one transaction,
      a payment output file fixed length flat format file that is generated based on the bank output file and information from the database, and includes data descriptive of the at least one transaction, and
      a payment input fixed length flat format file that is generated based on the payment output file and includes data descriptive of the at least one transaction;
   converting the several sets of source data into respective spreadsheets by converting the bank input file into a bank input spreadsheet, converting the bank output file into a bank output spreadsheet, converting the database file into a database spreadsheet, converting the payment output file into a payment output spreadsheet, and converting the payment input file into a payment input spreadsheet; and
   performing data validation across the several sets of source data by repeating the method of automated data verification for multiple pairs of the spreadsheets with:
      the bank input spreadsheet as the first spreadsheet and the bank output spreadsheet as the second spreadsheet,
      the bank output spreadsheet as the first spreadsheet and the database spreadsheet as the second spreadsheet,
      the bank output spreadsheet as the first spreadsheet and the payment output spreadsheet as the second spreadsheet,
      the database spreadsheet as the first spreadsheet and the payment output spreadsheet as the second spreadsheet,
      the payment output spreadsheet as the first spreadsheet and the payment input spreadsheet as the second spreadsheet, and
      the payment input spreadsheet as the first spreadsheet and the database spreadsheet as the second spreadsheet.

8. The method of claim 7, wherein the method further comprises generating the first spreadsheet and second spreadsheet by:
   receiving at least a first set of source data and a second set of source data;
   converting the first set of source data into a first spreadsheet including a first column name row and one or more rows of first data, using a first input positioning reference spreadsheet; and
   converting the second set of source data into a second spreadsheet including a second column name row and one or more rows of second data, using a second input positioning reference spreadsheet.

9. The method of claim 8, wherein the system receives the first input positioning reference spreadsheet and the second input positioning reference spreadsheet from a user.

10. The method of claim 8, wherein a user defines which data within the first set of source data and the second set of source data will be verified by:
- entering field name, start position, and end position data into the first input positioning reference spreadsheet that is descriptive of which data fields in the first set of source data will be imported into the first spreadsheet and where within the first set of source data said data fields are located; and
- entering field name, start position, and end position data into the second input positioning reference spreadsheet that is descriptive of which data fields in the second set of source data will be imported into the second spreadsheet and where within the second set of source data said data fields are located.

11. The method of claim 7, wherein the method further comprises:
- generating one of the first spreadsheet and second spreadsheet by querying a database to produce query results, and converting the query results into a spreadsheet format;
- generating one of the first spreadsheet and the second spreadsheet by receiving a fixed length flat format file and converting the fixed length flat format file to a spreadsheet format using an input positioning reference spreadsheet.

12. The method of claim 7, wherein the method verifies credit card data on transaction data that is passed between several parties in a credit card payment network.

13. The method of claim 12, wherein the method includes performing data verification across several credit card sets of source data by:
- receiving several credit card sets of source data, the several credit card sets of source data including:
  - the bank input fixed length flat format file including data descriptive of at least one credit card transaction,
  - the bank output fixed length flat format file that is generated based on the bank input file and includes data descriptive of the at least one credit card transaction,
  - the database file generated by querying the database and exporting the query results and includes data descriptive of the at least one credit card transaction,
  - the payment output file fixed length flat format file that is generated based on the bank output file and information from the database, and includes data descriptive of the at least one credit card transaction, and
  - the payment input fixed length flat format file that is generated based on the payment output file and includes data descriptive of the at least one credit card transaction.

14. One or more non-transitory computer readable storage media encoded with instructions that, when executed by a processor of a computing device, causes the processor to perform data verification across several credit card sets of source data by:
- receiving first credit card source data set including data descriptive of at least one credit card transaction;
- receiving second credit card source data set including data descriptive of the at least one credit card transaction;
- converting the first credit card source data set into a first spreadsheet;
- converting second credit card source data set into a second spreadsheet;
- using a filter function on the first spreadsheet to filter all but one row of credit card transaction data, and using a filter function on the second spreadsheet to filter all but one row of credit card transaction data, the one row in the first spreadsheet and the one row in the second spreadsheet being descriptive of the same credit card transaction;
- creating a first hashmap from the one row in the first spreadsheet, and creating a hashmap from the one row in the second spreadsheet;
- comparing the first hashmap to the second hashmap;
- generating an output report identifying when any value of data descriptive of the credit card transaction in the first spreadsheet does not match a value of corresponding data descriptive of the same credit card transaction in the second spreadsheet;
- wherein the processor performs data verification across several credit card sets of source data by:
- receiving several credit card sets of source data, the several credit card sets of source data including:
  - a bank input fixed length flat format file including data descriptive of at least one credit card transaction,
  - a bank output fixed length flat format file that is generated based on the bank input file and includes data descriptive of the at least one credit card transaction,
  - a database file generated by querying a database and exporting the query results and includes data descriptive of the at least one credit card transaction,
  - a payment output file fixed length flat format file that is generated based on the bank output file and information from the database, and includes data descriptive of the at least one credit card transaction, and
  - a payment input fixed length flat format file that is generated based on the payment output file and includes data descriptive of the at least one credit card transaction;
- converting the several credit card sets of source data into respective credit card spreadsheets by converting the bank input file into a bank input spreadsheet, converting the bank output file into a bank output spreadsheet, converting the database file into a database spreadsheet, converting the payment output file into a payment output spreadsheet, and converting the payment input file into a payment input spreadsheet; and
- performing data validation across the several credit card sets of source data by repeating the steps of using the filter function, creating the hashmaps, and comparing the hashmap for multiple pairs of the credit card spreadsheets with:
  - the bank input spreadsheet as the first spreadsheet and the bank output spreadsheet as the second spreadsheet,
  - the bank output spreadsheet as the first spreadsheet and the database spreadsheet as the second spreadsheet,
  - the bank output spreadsheet as the first spreadsheet and the payment output spreadsheet as the second spreadsheet,
  - the database spreadsheet as the first spreadsheet and the payment output spreadsheet as the second spreadsheet,
  - the payment output spreadsheet as the first spreadsheet and the payment input spreadsheet as the second spreadsheet, and the payment input spreadsheet as the first spreadsheet and the database spreadsheet as the second spreadsheet.

15. The non-transitory computer readable storage media of claim 14, wherein the step of converting the first credit card source data set into the first spreadsheet includes converting a first credit card fixed length flat format file into the first spreadsheet by:
mapping a set of field names, a set of start positions, and a set of end positions with an input positioning reference spreadsheet for each type of credit card transaction data in the first credit card data file that is to be imported into the first spreadsheet.

16. The non-transitory computer readable storage media of claim 14, wherein
the first credit card source data set includes data descriptive of a plurality of credit card transactions;
the second credit card source data set includes data descriptive of the same plurality of credit card transactions; and
wherein the steps of filtering the first spreadsheet and the second spreadsheet, creating the first hashmap and second hashmap, and comparing the first hashmap to the second hashmap, are repeated for each row of data in the first spreadsheet.

17. The non-transitory computer readable storage media of claim 14, wherein the processor performs data verification across several credit card sets of source data by
receiving a plurality of credit card sets of source data;
verifying any one of the plurality of plurality of credit card sets of source data against any other of the plurality of credit card sets of source data by designating the one of the plurality of credit card sets of source data as the first credit card source data set, and designating another of the plurality of credit card sets of source data as the second credit card source data set; and
repeating this process until each of the plurality of credit card sets of source data has been verified against each of the others of the plurality of credit card sets of source data.

18. The non-transitory computer readable storage media of claim 15, wherein
the processor receives each input positioning reference spreadsheet from a user.

19. The non-transitory computer readable storage media of claim 14, wherein
the first spreadsheet includes a first column name row, and the second spreadsheet includes a second column name row;

the step of creating the first hashmap includes: converting each of one or more fields in the first column name row into one or more first hashmap keys, converting each of one or more fields in the one row in the first spreadsheet generated by the filter function into one or more first hashmap values, the first hashmap values corresponding to the first hashmap keys based on the column location of the fields in the one row of the first spreadsheet;
the step of creating the second hashmap includes: converting each of one or more fields in the second column name row into one or more second hashmap keys, converting each of one or more fields in the one row in the second spreadsheet generated by the filter function into one or more second hashmap values, the second hashmap values corresponding to the second hashmap keys based on the column location of the fields in the one row of the second spreadsheet; and
the step of comparing the first hashmap to the second hashmap includes:
matching each of one or more first hashmap keys to each of one or more identical second hashmap keys then determining if the first hashmap value paired with that key is identical to the second hashmap value paired with said key.

20. The method of claim 14, wherein the processor performs data verification across several credit card sets of source data by:
receiving several credit card sets of source data, the several credit card sets of source data including:
the bank input fixed length flat format file including data descriptive of at least one credit card transaction,
the bank output fixed length flat format file that is generated based on the bank input file and includes data descriptive of the at least one credit card transaction,
the database file generated by querying the database and exporting the query results and includes data descriptive of the at least one credit card transaction,
the payment output file fixed length flat format file that is generated based on the bank output file and information from the database, and includes data descriptive of the at least one credit card transaction, and
the payment input fixed length flat format file that is generated based on the payment output file and includes data descriptive of the at least one credit card transaction.

* * * * *